US010117301B2

(12) United States Patent
Borlez

(10) Patent No.: US 10,117,301 B2
(45) Date of Patent: Oct. 30, 2018

(54) SURGE PROTECTION FOR LIGHT-EMITTING DIODES

(71) Applicant: SCHREDER, Brussels (BE)

(72) Inventor: Yves Borlez, Huere-le-Roman (BE)

(73) Assignee: SCHREDER, Brussels (BE)

( * ) Notice: Subject to any disclaimer, the term of this patent is extended or adjusted under 35 U.S.C. 154(b) by 0 days.

(21) Appl. No.: 14/947,189

(22) Filed: Nov. 20, 2015

(65) Prior Publication Data
US 2016/0150606 A1 May 26, 2016

(30) Foreign Application Priority Data

Nov. 21, 2014 (EP) .................................... 14194411

(51) Int. Cl.
H05B 33/08 (2006.01)

(52) U.S. Cl.
CPC ..... *H05B 33/0887* (2013.01); *H05B 33/0803* (2013.01); *Y02B 20/341* (2013.01)

(58) Field of Classification Search
CPC ............ H05B 33/0803; H05B 33/0884; H05B 33/0875; H05K 1/0257; H05K 1/0256; H05K 9/0064; H05K 9/0066; H05K 2201/073; H05K 2201/0738; H05K 2201/0746; H05K 2201/0776; H01C 7/12; H01C 8/04; H01L 23/62; H01T 4/06
See application file for complete search history.

(56) References Cited

U.S. PATENT DOCUMENTS

| 2006/0055012 A1* | 3/2006 | Hsin Chen | .......... H01L 25/0753 257/678 |
| 2010/0148673 A1* | 6/2010 | Stewart | .............. H05B 33/0803 315/121 |
| 2010/0231138 A1* | 9/2010 | Kumada | ............ H05B 33/0809 315/291 |
| 2011/0025278 A1* | 2/2011 | Balakrishnan | .......... H02M 1/32 320/166 |

(Continued)

FOREIGN PATENT DOCUMENTS

| JP | 2010245054 A | 10/2010 |
| KR | 10-1040215 B1 | 6/2011 |
| WO | 2014029772 A1 | 2/2014 |

OTHER PUBLICATIONS

European Search Report dated Oct. 30, 2015, issued in corresponding European Application No. 14194411.6, filed Nov. 21, 2014, 7 pages.

(Continued)

*Primary Examiner* — Tung X Le
*Assistant Examiner* — Henry Luong
(74) *Attorney, Agent, or Firm* — Christensen O'Connor Johnson Kindness PLLC

(57) ABSTRACT

Described herein is a surge protection device for protecting luminaires from high surge voltages. The surge protection device comprises shunt impedance elements positioned in connections between a driver and a light-emitting diode module to direct current generated by differential mode surges and/or common mode surges to ground so that light-emitting diode elements in the light-emitting diode module are not destroyed. Series impedance elements may also be provided between the driver and the shunt impedance elements.

19 Claims, 7 Drawing Sheets

(56) References Cited

U.S. PATENT DOCUMENTS

| | | | | |
|---|---|---|---|---|
| 2011/0133655 A1* | 6/2011 | Recker | ...................... | H02J 9/02 |
| | | | | 315/159 |
| 2013/0258663 A1* | 10/2013 | Woodgate | ................. | F21K 9/00 |
| | | | | 362/236 |
| 2013/0278138 A1* | 10/2013 | Yagi | ................... | H05B 33/0821 |
| | | | | 315/71 |
| 2015/0222109 A1* | 8/2015 | Wang | ..................... | H02H 9/042 |
| | | | | 315/246 |
| 2016/0270161 A1* | 9/2016 | Malyna | .............. | H05B 33/0884 |

OTHER PUBLICATIONS

European Office Action dated Jul. 7, 2017, issued in corresponding European Application No. 14194411.6, filed Nov. 21, 2014, 15 pages.

\* cited by examiner

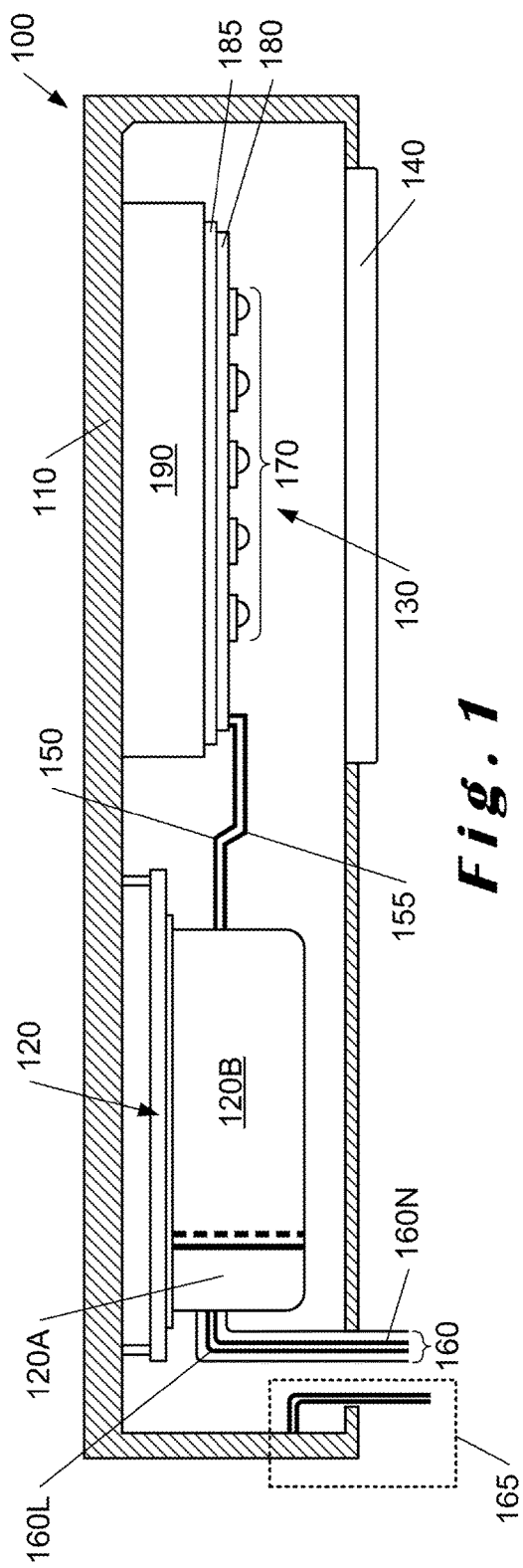
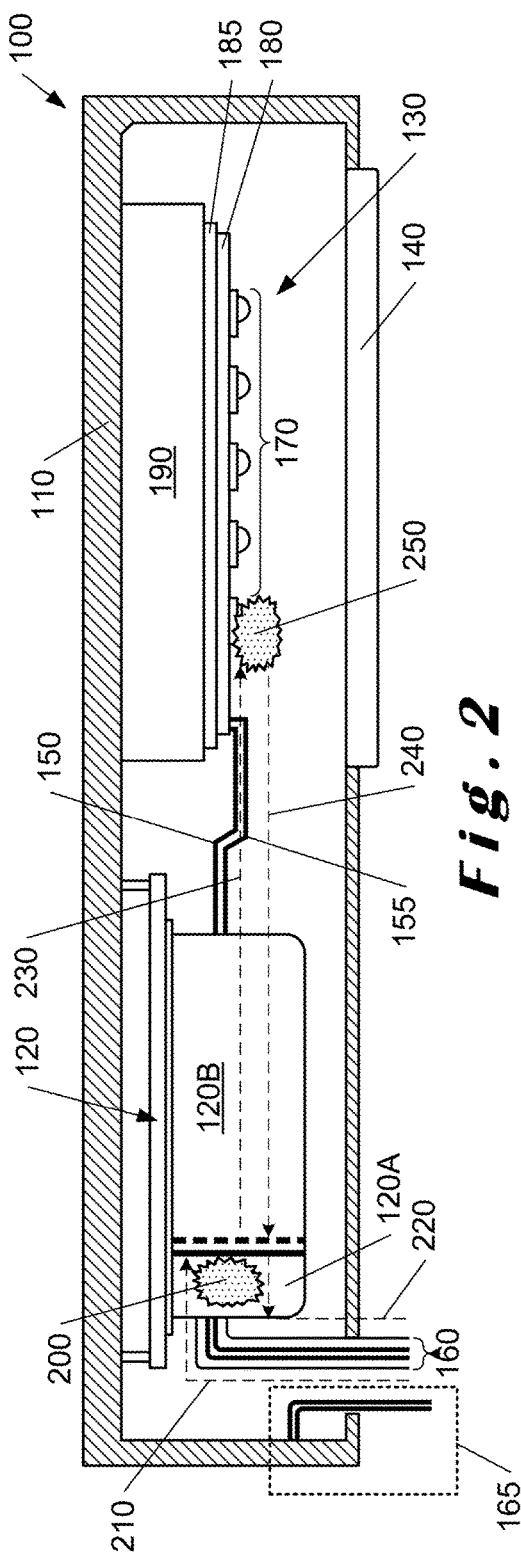

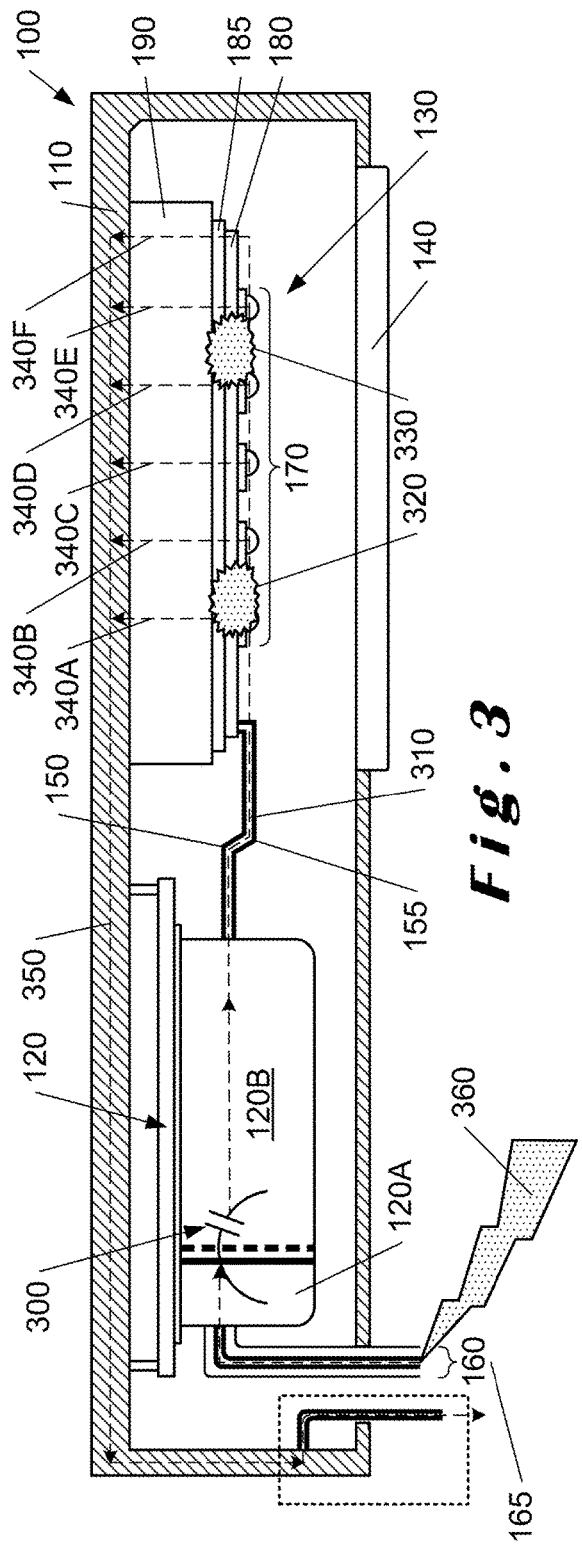
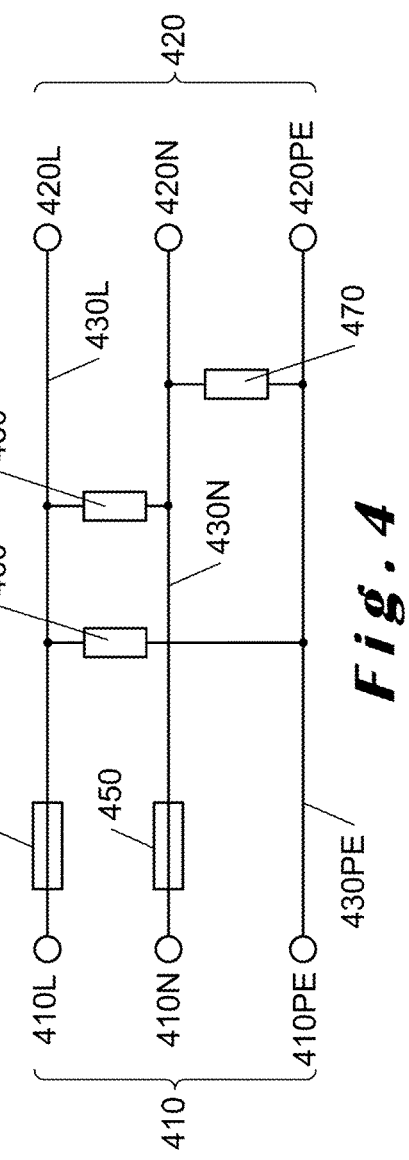
Fig. 3
Fig. 4

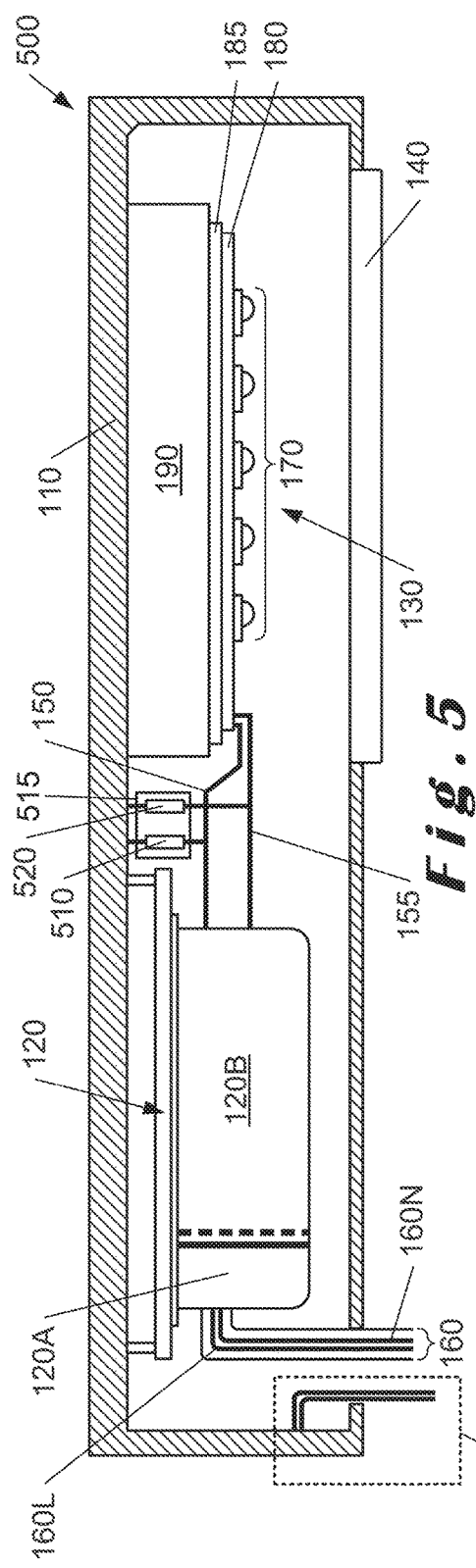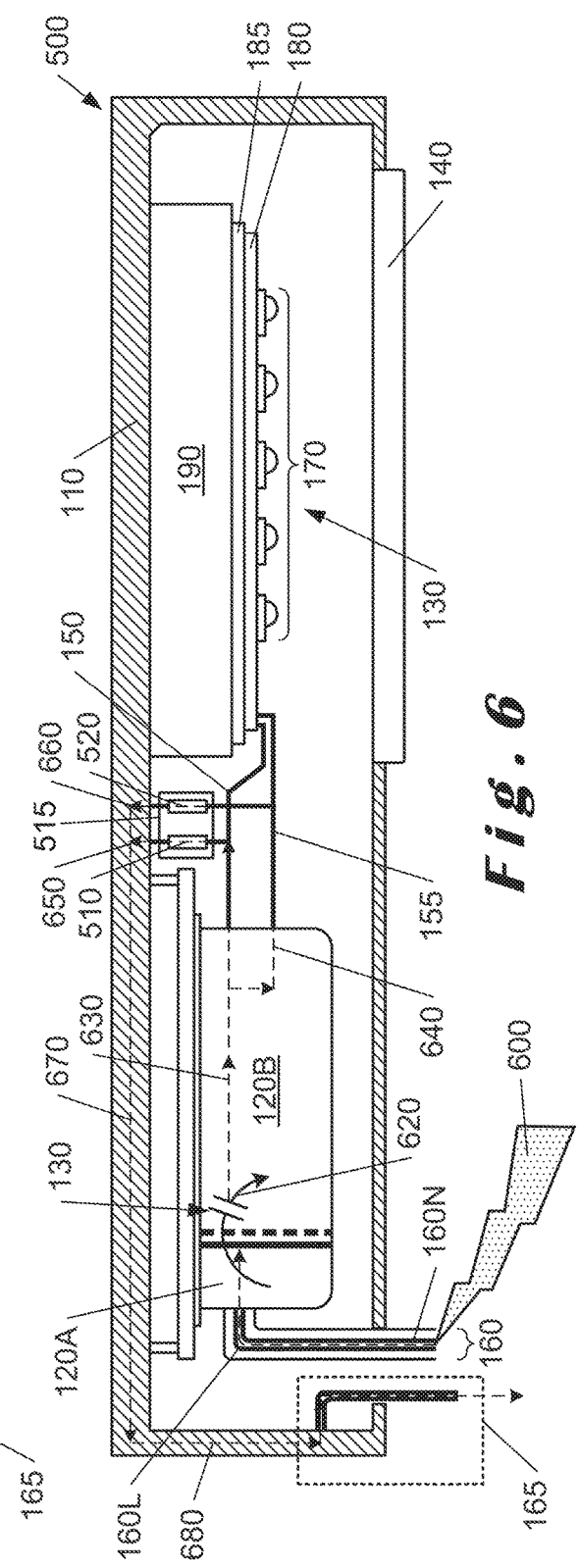

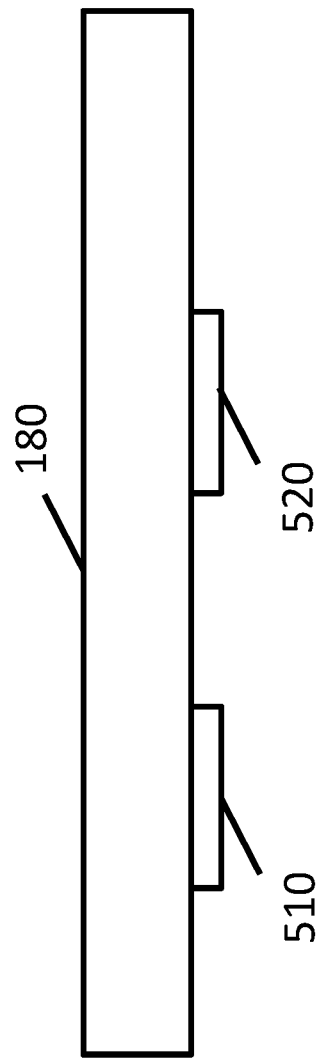

SURGE PROTECTION FOR LIGHT-EMITTING DIODES

CROSS-REFERENCE TO RELATED APPLICATION

This application claims priority from EP14194411.6, filed on Nov. 21, 2014.

FIELD OF THE INVENTION

The present invention relates to surge protection for light-emitting diodes and is more particularly concerned with surge protection for such diodes when implemented in a luminaire.

BACKGROUND

Light-emitting diode (LED) luminaires are often subject to high surge voltages having different origins. These surge voltages can be generated by lightning strikes, by transients during the switching on/off of inductive loads connected on the same network as LED luminaire, or by heavy industrial machines.

Additionally, in some situations, surge voltages can be generated by electrostatic charges which have accumulated on the luminaire body, and which are able to find a way to discharge through the LEDs and the LED driver within the luminaire housing to the mains connection lines. LEDs are particularly sensitive to high voltage strikes and could be damaged even without apparent damage to the LED driver. The consequence can be, some if not all, LEDs within a group of LEDs short circuiting as their dies have been destroyed by high voltages.

Such high surge voltages can be either in differential mode, where the high voltage appears across the mains supply, that is, between the Line and Neutral wires of the mains supply, or in common mode, where both the Line and Neutral wires of the main supply experience a high voltage transient relative to Ground. A combination of differential mode and common mode surges is also possible.

In order to protect a luminaire against high surge voltages, protection components are often provided in the input path of the luminaire, that is, in between the mains supply and a driver for an associated light-emitting diode module, and, often comprise metal oxide varistors (MOV) or gas discharge tubes (GDT) or a combination of both. These protection components are relatively efficient against differential mode surges as they are connected between Line and Neutral wires and absorb the energy of the surge having a current as high as several kA. Such protection components tend to provide good protection for the driver as it is the most susceptible to differential mode surges.

However, the problem is different for common mode surges. There are two cases situations depending on the IEC protective Class to which the luminaire is designed. In the case of a Class I luminaire, the presence of a protective earth (PE) connection allows protection components to be connected between the Line and PE or between Neutral and PE. These protection components tend to provide good protection against common mode surges. Moreover, series fuses inserted between the input and the protection component will shut off the circuit when the protection components are short circuited.

In the case of a Class II luminaire, there is no PE connection and no connections are allowed between the Line and Neutral wires of the mains supply and the luminaire housing for electrical safety reasons. This means that only differential protection components can be used for Class II luminaires. Nevertheless, this does not means that a surge cannot find a reliable return to Ground, as a return can inadvertently be provided through the metal frame or enclosure of the luminaire which is mounted on a metal pole which, in turn, is in direct contact with Ground.

In WO-A-2014/029772, an insulation member capable of sustaining the voltage levels of lightning strikes within the electrical path from a luminaire frame to Ground is provided for isolating the LED luminaire from Ground. Without return currents, there would be no damage to the luminaire. This is possible when the luminaire frame is mounted on a glass fibre or concrete pole, but is difficult to implement when the luminaire frame is mounted on a metal pole.

Additionally, it is also important to consider the potential danger for the LEDs due to high static voltages that can build up by electrisation of the luminaire frame due to the presence of heavily charged clouds during a lightning storm. In this case, it is also beneficial to avoid any high voltage differences between the LEDs and the luminaire frame.

SUMMARY

It is therefore an object of the present invention to provide surge protection for the LEDs, which are the most sensitive components to high surge voltages.

It is a further object of the present invention to provide a low cost, easy to implement measure to improve the protection of luminaire LEDs to both common mode and differential mode surges.

In accordance with one aspect of the present invention, there is provided a surge protection device configured to protect a luminaire including a metal frame, at least one light-emitting diode module comprising a circuit board and at least one driver configured to transform mains voltage for said at least one light-emitting diode module, each driver and each light-emitting diode module being mounted on the frame with an electrical connection between a driver and its associated light-emitting diode module, the surge protection device comprising at least one shunt impedance element located between the electrical connection between each driver and its associated light-emitting diode module and the frame, each shunt impedance element comprising at least one of: a capacitor, a resistor and a semiconductor-based component.

By providing at least one shunt impedance element between the electrical connection between the driver and its associated light-emitting module and the frame, high currents generated due to surges are redirected to Ground via the frame and do not affect light-emitting diodes in the light-emitting diode module. It will be appreciated that at least one shunt impedance element is provided for each of LED+ and LED− connections of the light-emitting diode module.

Advantageously, by using capacitors, resistors and semiconductor-based components, a reliable and relatively inexpensive solution can be provided for surge protection for light-emitting diode modules and their associated light-emitting diodes. In particular, by using capacitors and resistors, there is no threshold at which the capacitors and resistors will always operate and any surge will be shunted through to the frame and then to Ground.

In one embodiment, said at least one shunt impedance element is mounted on said circuit board of said at least one light-emitting module.

In another embodiment, said at least one shunt impedance element is located in a connection box between the driver and the light-emitting diode module.

In one embodiment, said at least one shunt impedance element comprises a capacitor. Each capacitor may comprise either an X-capacitor or Y-capacitor having predetermined electrical safety characteristics. Said capacitors may have a capacitance value between 10 nF and 1000 nF.

In another embodiment, said at least one shunt impedance element comprises a resistor. Said resistor may comprise a resistance value between 1 MΩ and 10 MΩ.

In a further embodiment, said at least one shunt impedance element comprises a semiconductor-based component having a trigger voltage which is lower than an insulation voltage between the light-emitting diode module and the frame. The semiconductor-based component may comprise a Zener diode or a semiconductor transient suppressor.

In addition, at least one series impedance element may be positioned between said at least one driver and said at least one shunt impedance element.

In one embodiment, said at least one series impedance element comprises an inductor.

In another embodiment, said at least one series impedance element comprises a common mode filter. The common mode filter may comprise two coupled inductors.

DESCRIPTION OF THE DRAWINGS

For a better understanding of the present invention, reference will now be made, by way of example, to the accompanying drawings in which:

FIG. 1 illustrates a schematic view of a typical outdoor LED luminaire;

FIG. 2 is similar to FIG. 1 but illustrating the propagation of a differential mode surge through the luminaire;

FIG. 3 is similar to FIG. 1 but illustrating the propagation of a common mode surge through the luminaire;

FIG. 4 illustrates a schematic layout of the use of protection components at the input to a luminaire;

FIG. 5 is similar to FIG. 1 but illustrating surge protection components for the LED elements in accordance with the present invention;

FIG. 6 is similar to FIG. 5 but illustrating current flow through the surge protection components in the event of a surge voltage;

FIG. 10 illustrates at least one shunt impedance element 510, 520 located on the circuit board 180.

DETAILED DESCRIPTION

Figure 7:
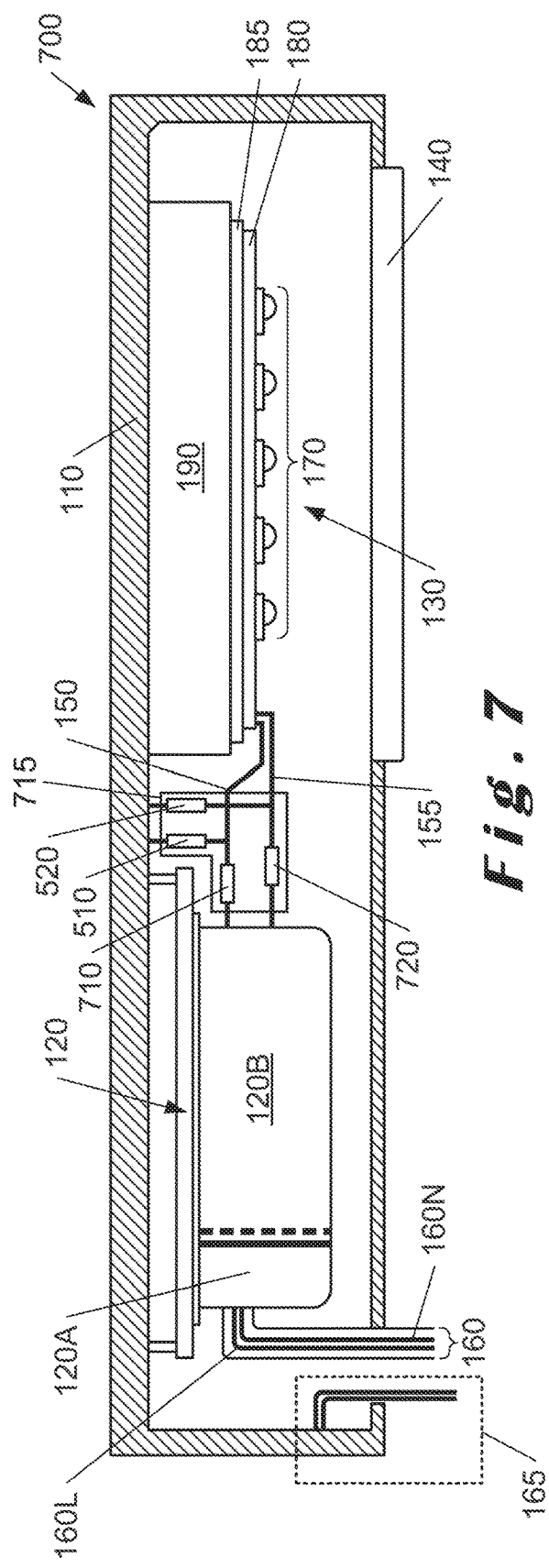
FIG. 7 is similar to FIG. 5 but illustrating further surge protection components for the LED elements in accordance with the present invention.
Figure 8:
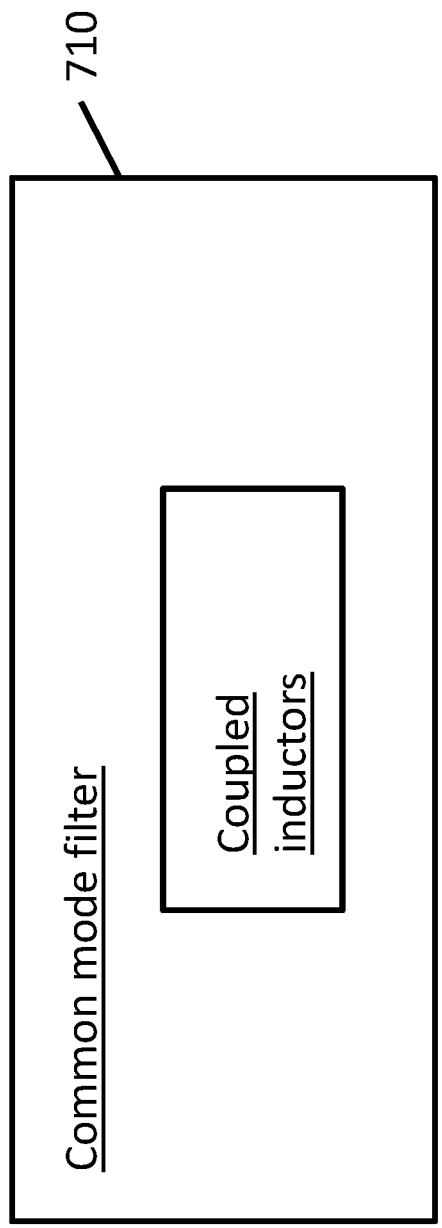
FIG. 8 illustrates a common mode filter 710 having coupled inductors.
Figure 9:
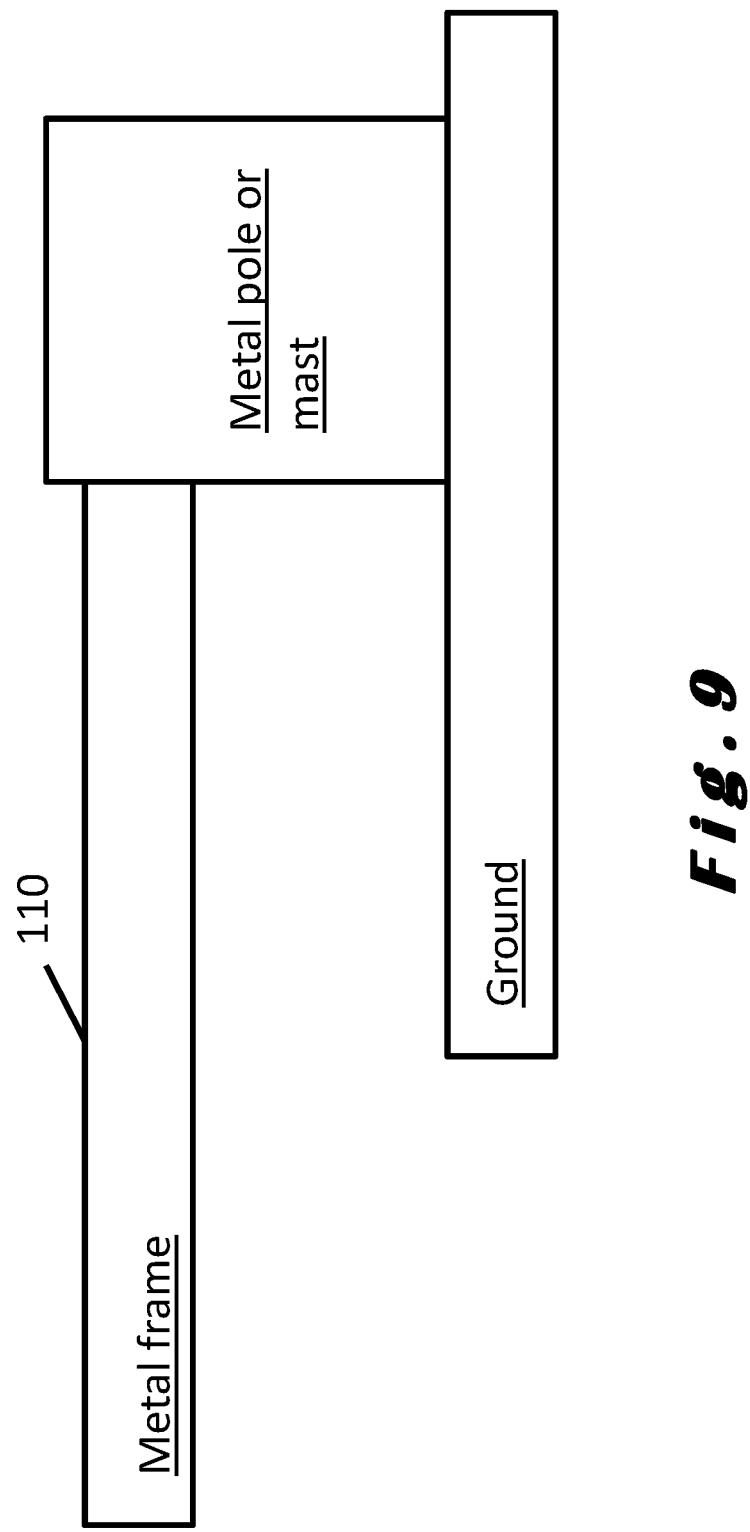
FIG. 9 illustrates a metal frame 110 mounted on a metal pole or mast in contact with the ground.

The present invention will be described with respect to particular embodiments and with reference to certain drawings but the invention is not limited thereto. The drawings described are only schematic and are non-limiting. In the drawings, the size of some of the elements may be exaggerated and not drawn on scale for illustrative purposes.

Luminaires are often composed of a metal frame connected to Ground by a protective earth (PE) connection. This is the case for a Class I luminaire (IEC protective Class). In the case where the luminaire is not equipped with a PE connection, the luminaire is called a Class II device. Nevertheless, this does not mean that there is no possibility for ground return, as the metal frame can be in contact with a metallic pole, which, in turn, is in fairly good contact with the ground. However, the ground is not as reliable in terms of providing electrical safety, but it can be very good for returning surge currents.

Referring initially to FIG. 1, a typical outdoor luminaire 100 is shown. The luminaire 100 comprises a metal frame 110 to which an LED driver 120 and an LED module 130 are mounted. The metal frame 110 has a transparent or lens portion 140 which is aligned with the LED module 130 so that light provided by the LED module can be directed to an appropriate area or region which is to be lit by the luminaire 100.

The term "metal frame" as used herein is intended to refer, not only to a frame within the luminaire housing or casing to which components of the luminaire are mounted, but also to the luminaire housing or casing. In many embodiments, the metal frame comprises the luminaire housing or casing.

The LED driver 120 comprises a primary side 120A and a secondary side 120B which are insulated from one another (not shown), the primary side being connected to the mains supply 160 and the secondary side being connected to the LED module 130 by means of electrical connections 150, 155, one electrical connection being connected to the LED+ line (not shown) and the other electrical connection being connected to the LED− line (also not shown). As shown, the mains supply 160 has a Line wire 160L and a Neutral wire 160N. The metal frame 110 has a PE connection 165 as is the case for Class I luminaires as described above.

For Class II luminaires (not shown), there is no PE connection and the frame 110 is connected to Ground through the metal frame 110 and the metal pole or mast (not shown) on which the metal frame is mounted.

The insulation between the primary and secondary sides 120A, 120B of the LED driver 120, depending on the type of LED driver, may be capable of sustaining a limited high voltage to prevent a surge from reaching the secondary side 120B of the LED driver 120.

The LED module 130 comprises a plurality of LED elements 170 arranged in a pattern on a circuit board 180, the circuit board including LED+ and LED− lines for connecting to respective ones of the electrical connections 150, 155 as described above. It will readily be appreciated that the LED elements 170 may be arranged in any suitable pattern on the circuit board 180 in accordance with desired lighting requirements.

The LED module is mounted on a heat spreader 190 for the dissipation of heat generated by the LED elements 170 when the luminaire 100 is turned on.

As described above, the Line and Neutral wires 160L, 160N feed the primary side 120A of the LED driver 120 at mains voltage, typically comprising an alternating voltage of around 230V (at least in mainland Europe). The secondary side 120B transforms the mains voltage to provide a DC current (and voltage) for the LED module 130, and in particular, to the circuit board 180 on which the LED elements 170 are mounted.

As described above, the LED driver 120 provides, most of the time, an electrical insulation between its primary side or circuit 120A and its secondary side or circuit 120B which can withstand some high surge voltages as described above. However, this may not be the case for all LED drivers, and, additional surge protection is required for the LED module 130.

The LED elements 170 and the circuit board 180 on which they are mounted are isolated from the metal frame 110 of the luminaire 100 by an insulating layer 185 provided between the circuit board 180 and the heat spreader 190.

FIG. 2 illustrates the propagation of a differential mode surge arising between the Line and Neutral wires 160L, 160N of the luminaire 100 shown in FIG. 1. Elements of the luminaire 100 previously described in FIG. 1 are numbered the same and will not be described again here.

In this case, the high voltage is substantially applied to components in the primary side 120A of the LED driver 120 (not shown in detail). These components may comprise electromagnetic capability (EMC) capacitors, common mode filters, rectifying bridges and switching transistors.

In the majority of situations as described above, the input of the LED driver 120 will be the victim of such a surge 200 which has an input path 210 and a return path 220, and, insulation between the primary side 120A and the secondary side 120B in the LED driver 120 may be sufficient to protect the LED elements 170. Nevertheless, if such a differential surge propagates into the secondary side 120B as indicated by input path 230 and return path 240 and provokes a high surge voltage 250 between the LED+ and LED− connections (not shown) on the circuit board 180, it is also capable of destroying the LED elements 170 as well as the circuit board itself on which they are mounted.

FIG. 3 illustrates the propagation of a common mode surge arising on both Line and Neutral wires 160L, 160N of the luminaire 100 shown in FIG. 1 with respect to the Ground. Elements of the luminaire 100 previously described in FIG. 1 are numbered the same and will not be described again here.

This kind of situation is more dangerous for the LED elements 170 as a common mode surge can propagate through the LED driver 120 because the insulation barrier between the primary side 120A and the secondary side 120B is often by-passed by some EMC capacitors, indicated for example at 300, which provide a high speed pass through to the LED module 130.

Furthermore, LED drivers for Class II luminaires are also isolated from the metal frame 110 of the luminaire 100, and do not provide any internal return to Ground. As a consequence, a surge voltage hitting the primary side 120A (input) of the LED driver 120 is almost completely transferred to the secondary side 120B (output), and then to the LED module 130 by connections 150, 155, as indicated by arrow 310, until a voltage breakdown, as indicated at 320 and 330, occurs on the circuit board 180 on which the LED elements 170 are mounted.

As the heat spreader 190 tends to be both electrically and thermally conductive, current flows from the voltage breakdown as shown at 320, 330, through the insulating later 185 (which is also destroyed by the surge voltage) to the heat spreader 190 into the metal frame 110 on which the heat spreader 190 is mounted, as indicated by arrows 340A, 340B, 340C, 340D, 340E, 340F. The current flow merges in the metal frame 110 and then flows along the metal frame 110, as indicated by arrow 350, to Ground via the PE connection 165. This is how the common mode surge finds its way to return to Ground, that is, via the metal frame 110 and its PE connection 165.

For Class II luminaires, the common mode surge is transferred to Ground via the mechanical connection between the frame and the metal pole or mast on which it is mounted.

Although six current paths are shown through the heat spreader 190 to the metal frame 110, it will be appreciated that this is by way of illustration only and that any number of current paths may be generated through the heat spreader in accordance with areas of breakdown on the circuit board 180 and/or failure of the LED elements 170.

Additionally, the circuit board 180 on which the LED elements 170 are mounted often includes large copper areas for the purpose of heat dissipation. These large areas create a relative large capacitance that can allow high speed surges to go through and generate detrimental currents through the LED elements 170.

On the other hand, when a electrostatic charge accumulates on the metal frame 110 of the luminaire 100, or when the local ground experiences a sudden potential rise due to a local lightning strike, as indicated at 360, the voltage between the metal frame 110 and Line and Neutral wires 160L, 160N respectively will be so high that the surge will find a return by the PE connection 165 due to the difference in potential of several KV between the frame 110 and the mains supply lines 160. A voltage breakdown will take place between the frame and the Line and Neutral wires 160L, 160N, passing through the LED elements 170 and the LED driver 120.

As described above, for Class I luminaires, protection components can be provided for common mode surges. A schematic diagram 400 is shown in FIG. 4 which illustrates the location of such protection components.

In FIG. 4, a mains input 410 comprises Line and Neutral terminals 410L, 410N respectively, and a PE connection 410PE, and is connected to an input 420 to the primary side 120A of the LED driver 120 as shown in FIG. 1. The terminals at the input 420 are labelled as 420L, 420N and 420PE respectively and each terminal is connected to a respective one of the terminals 410L, 410N and 410PE via a wire connection 430L, 430N and 430PE as shown.

Series fuses 440, 450 are shown in respective ones of the Live and Neutral wire connections 430L, 430N. Protection elements 460, 470 and 480 are also shown which are respectively located between the Line wire connection 430L and the PE wire connection 430PE; the Neutral wire connection 430N and the PE wire connection 430PE; and the Line and Neutral wire connections 430L, 430N as shown.

Protection elements 460, 470, 480 may comprise metal oxide varistors (MOVs), gas discharge tubes (GDTs) or a combination of MOVs and GDTs as described above.

The series fuses 440, 450 operate in conjunction with the protection components 460, 470, 480 and are operable to shut down the circuit, that is, the mains supply to the luminaire, when the protection components 460, 470, 480 are short circuited.

However, whilst these protection components 460, 470, 480 operate to protect the LED driver 120, they may not be sufficient to prevent destruction of at least a portion of the circuit board 180 and at least some of the LED elements 170 mounted thereon before they are activated.

Therefore, in order to avoid destruction of LED elements 170, a good approach is to ensure that no dangerous voltages can be generated between the circuit board 180 on which the LED elements 170 are mounted and the metal frame 110 of the luminaire 100.

In FIG. 5, a luminaire 500 is shown which is identical to luminaire 100 in FIG. 1 except for the addition of protection components in accordance with the present invention. Shunt impedance elements 510, 520 which are inserted across respective ones of each of the electrical connections 150, 155 (between the LED driver 120 and the LED+ and LED− lines on the circuit board 180 to which the LED elements 170 are connected) and the metal frame 110 of the luminaire 500.

In the case of a common mode surge, these shunt impedance elements 510, 520 provide a direct return path for surge currents via the metal frame 110 of the luminaire 500 to Ground. These shunt impedance elements 510, 520 can also be used to avoid any electrostatic charge build up and static high voltage between the circuit board 180 and the metal frame 110 of the luminaire 500 during electrostatic build-up in clouds as a precursor to, or during, lightning storms.

As the LED driver 120 is generally more rugged to high surge voltages then the LED elements 170, it generally tends to survive such high surge voltages while the LED elements would be destroyed. In addition, the LED driver 120 is also capable of absorbing any electrostatic charges delivered by the shunt impedance elements 510, 520 so that any electrostatic discharges are prevented from passing through to the LED elements 170. This is shown more clearly in FIG. 6.

In FIG. 6, the luminaire 500 is shown with a surge voltage 600 at the mains input 160. The surge voltage 600 passes through to the primary side 120A (input) of the LED driver 120, as indicated by arrow 610, and is almost completely transferred to the secondary side 120B, as indicated by arrow 620, and passes therethrough, as indicated by arrows 630, 640 and into connections 150, 155. Instead of the surge voltage causing damage to the LED elements 170 as described above with reference to FIG. 3, the current is channelled via the shunt impedance elements 510, 520 as indicated by arrows 650, 660 respectively, into the metal frame 110 and to Ground via the PE connection 165, as indicated by arrows 670, 680 and 690.

Both common mode and differential mode surges at the input of the LED driver 120 may also generate a high voltage between the LED+ and LED− lines on the circuit board 180 connected to the secondary side 120B of the LED driver 120 by respective connections 150, 155. The two shunt impedance elements 510, 520 are efficient in reducing this high voltage. In this case, the two shunt impedance elements 510, 520 act as if they were connected in series across the LED+ and LED− lines, that is, across connections 150, 155 and the frame 110. It is also possible to limit the surge current and to enhance the driver protection by inserting series components ahead of the shunt impedance elements 510, 520 as shown in FIG. 7.

In FIG. 7, a luminaire 700 similar to that shown in FIG. 5 is shown but with the addition of series impedance elements 710, 720 in respective ones of connections 150, 155 between the LED driver 120 and the shunt impedance elements 510, 520. These series impedance elements 710, 720 also further reduce the voltage between the circuit board 180 and the LED elements 170 and the metal frame 110 and act as current limiters in case of a surge while having no impact on the DC current which is provided to the LED elements 170 by the LED driver 120.

In a preferred embodiment, the shunt impedance elements 510, 520 and/or series impedance elements 710, 720 are located on the circuit board 180 on which the LED elements 170 are mounted. Alternatively, these impedance elements can also be available on a connection box 515 located anywhere between the secondary side 120B of the LED driver 120 and the circuit board 180 on which the LED elements 170 are mounted. In another alternative, the series impedance elements 710, 720 may be located in a connection box 715 located between the secondary side 120B of the LED driver 120 and the circuit board 180 with the shunt impedance elements 510, 520 being located on the circuit board 180.

The choice of the type of shunt impedance element is important to provide efficient protection, and such a shunt impedance element may comprise one of the following: a capacitor, a resistor, and a semiconductor-based component, such as, but not limited to, a Zener diode and a semiconductor transient suppressor.

If the shunt impedance elements 510, 520 comprise capacitors, they will form, with the primary to secondary parasitic capacitance of a transformer between the primary side 120A and the secondary side 120B of the LED driver 120 (shown as 300 in FIGS. 3 and 6), a dividing bridge that will reduce significantly the common mode voltage at the output of the LED driver 120, provided that the shunt capacitance values are significantly larger that the parasitic capacitance values of the primary and secondary sides 120A, 120B of the transformer in the LED driver 120. As these shunt capacitors are effectively positioned across an insulation layer (layer 185 in the LED module 130), it is important to select capacitors that are suitable for this type of application, for example, line filter capacitors such as X-capacitors (connectable between Line and Neutral) and/or Y-capacitors (connectable between Live and Ground), which have been regulated to meet international safety requirements. Capacitance values between 10 nF and 1000 nF are suitable, and, capacitance values around 100 nF have been found to provide good results.

If the shunt impedance elements comprise resistors, these can be used to avoid any electrostatic voltage build up between the metal frame 110 and the connection lines 150, 155 between the LED driver 120 and the LED+ and LED− lines on the circuit board 180 that could generate a destructive discharge. The typical resistance values of such resistors are within the range of 1 MΩ and 10 MΩ, preserving the safety of the electrical insulation between the circuit board 180 and associated LED elements 170 with respect to the metal frame 110.

If the shunt impedance elements comprise semiconductor-based components, they will trigger at a predetermined voltage, and, it is important to make sure that their trigger voltage is significantly lower than the intrinsic insulation level of the circuit board 180 and associated LED elements 170 with respect to the metal frame 110.

Naturally, the shunt impedance elements may comprise any combination of capacitors, resistors, and semiconductor-based components depending on the protection requirements.

The series impedance elements 710, 720 may comprise inductors which provide a high impedance to the high speed surges while being almost transparent to the DC current feeding the circuit board 180 and associated LED elements 170.

Additionally, a common mode filter may be configured from two coupled inductors (not shown) having suitable inductance values.

It will readily be appreciated that the surge protection device defined by the shunt impedance elements (and series impedance elements if present) may be supplemented by the provision of series fuses and protection elements between the mains supply 160 and the primary side 120A of the LED driver 120 as described above with reference to FIG. 4.

The present invention has been described with reference to a luminaire comprising a single LED module and a single LED driver. However, it will readily be appreciated that an LED driver may drive more than one LED module within the luminaire. In addition, there may be more than one LED driver in the luminaire which drives one or more LED modules. Where there is more than one LED module in the luminaire, the shunt impedance elements may be positioned across each LED module in respective connections between the LED driver and each LED module.

Although the present invention has been described with reference to specific embodiments, it will readily be appreciated that other embodiments are possible to prevent the destruction of LED elements in luminaires during surge voltages.

The embodiments of the invention in which an exclusive property or privilege is claimed are defined as follows:

1. A surge protection device configured to protect a luminaire, the luminaire including:
   a housing or casing;
   a metal frame comprising the housing or casing and configured to be connected to ground;
   at least one light-emitting diode module comprising a circuit board and a plurality of light-emitting elements mounted on the circuit board; and
   at least one driver configured to transform mains voltage for said at least one light-emitting diode module, said at least one driver and said at least one light-emitting diode module being mounted on the metal frame with at least two electrically conductive connections between said at least one driver and said at least one light-emitting diode module associated therewith, wherein a first electrically conductive connection is to a (+) line of said at least one light-emitting diode module, and a second electrically conductive connection is to a (−) line of said at least one light-emitting diode module;
   the surge protection device comprising at least one shunt impedance element for each of said first and second electrically conductive connections, wherein each of said shunt impedance elements is configured to be inserted across said metal frame and one of said first and second conductive connections to provide a direct return path via the metal frame to ground, said at least one shunt impedance element comprising at least one of: a capacitor, a resistor and a semiconductor-based component;
   wherein the surge protection device further comprises at least one series impedance element positioned between said at least one driver and said at least one shunt impedance element.

2. The surge protection device according to claim 1, wherein said at least one shunt impedance element is located in a connection box between the driver and the at least one light-emitting diode module.

3. The surge protection device according to claim 1, wherein said at least one shunt impedance element comprises the capacitor.

4. The surge protection device according to claim 3, wherein the capacitor comprises one of: an X-capacitor or Y-capacitor having predetermined electrical safety characteristics.

5. The surge protection device according to claim 4, wherein the capacitor has a capacitance value between 10 nF and 1000 nF.

6. The surge protection device according to claim 1, wherein said at least one shunt impedance element comprises the resistor.

7. The surge protection device according to claim 6, wherein said resistor comprises a resistance value between 1 MΩ and 10 MΩ.

8. The surge protection device according to claim 1, wherein the semiconductor-based component has a trigger voltage which is lower than an insulation voltage between the light-emitting diode module and the frame.

9. The surge protection device according to claim 8, wherein the semiconductor-based component comprises a Zener diode.

10. The surge protection device according to claim 8, wherein the semiconductor-based component comprises a semiconductor transient suppressor.

11. The surge protection device according to claim 1, wherein said at least one series impedance element comprises an inductor.

12. The surge protection device according to claim 1, wherein said at least one series impedance element comprises a common mode filter.

13. The surge protection device according to claim 12, wherein the common mode filter comprises two coupled inductors.

14. The surge protection device according to claim 1, wherein the metal frame is mounted on a metal pole or mast which is in contact with ground.

15. The surge protection device according to claim 1, wherein said at least one shunt impedance element is located on the circuit board.

16. The surge protection device according to claim 1, wherein said metal frame surrounds said at least one driver and said at least one light-emitting diode module.

17. The A surge protection device according to claim 16, wherein said metal frame comprises a transparent or lens portion which is aligned with the light-emitting diode module.

18. The surge protection device according to claim 1, wherein the at least one series impedance element is designed to act as current limiter in case of a current surge.

19. The surge protection device according to claim 18, wherein the at least one series impedance element is designed to have little impact on DC current.

* * * * *